United States Patent
Foerth et al.

(10) Patent No.: US 12,017,541 B2
(45) Date of Patent: Jun. 25, 2024

(54) VEHICLE AND METHOD FOR OPERATING SAME

(71) Applicant: Siemens Mobility GmbH, Munich (DE)

(72) Inventors: Christian Foerth, Erlangen (DE); Lennart Kilian, Gauting (DE); Stefan Koch, Gerhardshofen (DE); Norbert Lang, Fuerth (DE); Niklas Rueger, Rosstal (DE); Hans Bergner, Karlsruhe (DE); Karsten Hoke, Schoenebeck OT Pretzien (DE)

(73) Assignee: Siemens Mobility GmbH, Munich (DE)

( * ) Notice: Subject to any disclaimer, the term of this patent is extended or adjusted under 35 U.S.C. 154(b) by 275 days.

(21) Appl. No.: 17/763,307

(22) PCT Filed: Sep. 15, 2020

(86) PCT No.: PCT/EP2020/075684
§ 371 (c)(1),
(2) Date: Mar. 24, 2022

(87) PCT Pub. No.: WO2021/058319
PCT Pub. Date: Apr. 1, 2021

(65) Prior Publication Data
US 2022/0388403 A1 Dec. 8, 2022

(30) Foreign Application Priority Data
Sep. 24, 2019 (DE) .................... 10 2019 214 570.1

(51) Int. Cl.
*B60L 15/20* (2006.01)

(52) U.S. Cl.
CPC ....... *B60L 15/2009* (2013.01); *B60L 2200/26* (2013.01)

(58) Field of Classification Search
CPC .................... B60L 15/2009; B60L 2200/26
See application file for complete search history.

(56) References Cited

FOREIGN PATENT DOCUMENTS

| CN | 103718455 A | 4/2014 |
|---|---|---|
| CN | 105966266 A | 9/2016 |
| CN | 108016466 A | 5/2018 |

(Continued)

*Primary Examiner* — Michael D Lang
(74) *Attorney, Agent, or Firm* — Laurence A. Greenberg; Werner H. Stemer; Ralph E. Locher (57) ABSTRACT

A vehicle includes a drive motor with electrically upstream electric converter, a drive controller generating converter control signals actuating the converter for driving and normal braking operation, and an immobilizer electrically connected between the converter and the drive controller preventing converter control signals which would produce a driving operation of the drive motor from being forwarded to the converter when the vehicle is stopped, in particular at a stop. An alternate regulating device and a monitoring device allow activation of a special braking mode in the presence of an emergency braking command and in the event of which the drive controller is deactivated or at least signal flows of converter control signals of the drive controller to the immobilizer are interrupted, the immobilizer is activated, and converter control signals producing braking operation of the drive motor are transmitted to the converter through the immobilizer by the alternate regulating device.

12 Claims, 7 Drawing Sheets

(56) References Cited

FOREIGN PATENT DOCUMENTS

| | | | |
|---|---|---|---|
| DE | 19652588 | A1 | 6/1998 |
| DE | 10135797 | A1 | 2/2003 |
| DE | 102008014495 | A1 | 9/2009 |
| DE | 102015203303 | A1 | 8/2016 |
| DE | 102017213149 | A1 | 1/2019 |
| WO | 2016134964 | A1 | 9/2016 |
| WO | 2019025103 | A1 | 2/2019 |

VEHICLE AND METHOD FOR OPERATING SAME

FIELD AND BACKGROUND OF THE INVENTION

The invention relates to a vehicle, in particular a rail vehicle, with at least one drive motor with an electrically upstream electric converter, a drive controller for generating converter control signals for actuating the converter for a driving operation and a normal braking operation, and an immobilizer which is electrically connected between the converter and the drive controller and which is designed to prevent converter control signals, which would produce a driving operation of the drive motor, from being forwarded in the direction of the converter when the vehicle is stopped, in particular at a stop.

Vehicles of this kind are known, for example, in the field of railroad technology. The immobilizer serves to prevent undesirable moving-off of the vehicle at a stop.

Furthermore, it is known to brake rail vehicles during normal braking operation with the aid of the drive motor, which acts as a generator during the braking operation.

SUMMARY OF THE INVENTION

The object underlying the invention is to disclose a vehicle that is improved in respect of braking in the case of an emergency braking command.

This object is inventively achieved by a vehicle with the features of claim 1. Advantageous embodiments of the inventive vehicle are disclosed in subclaims.

Accordingly, it is inventively provided that the vehicle has an alternate regulating device and a monitoring device and allows a special braking mode which can be activated in the presence of an emergency braking command and in the event of which the drive controller is deactivated or at least the signal flow of converter control signals of the drive controller to the immobilizer is interrupted, the immobilizer is activated, and converter control signals, which produce a braking operation of the drive motor, are transmitted to the converter via the immobilizer by the alternate regulating device of the vehicle.

A fundamental advantage of the inventive vehicle can be seen in that even in the case of an emergency braking command, or an emergency-acting braking process, the drive motor can be used as an electric brake. With known vehicles, braking is, in principle, also possible with the aid of the drive motor in the presence of an emergency braking command, but this possibility is not used since there is a danger that in the case of malfunctioning of the drive controller, the drive motor could accelerate the vehicle instead of braking it. This is where the invention comes into play in that inventively an alternate regulating device is provided which can be activated in the presence of an emergency braking command and, instead of the drive controller, can therefore carry out the actuation of the converter and therewith the actuation of the drive motor for a safer braking operation.

The alternate regulating device is preferably functionally separate from the drive controller and independent of it.

The functional separation may be achieved particularly easily and advantageously if the drive controller and the alternate regulating device are formed by functionally separate software modules which are independent of each other and are executed by separate computing devices or the same computing device.

In a variant that is regarded as being particularly advantageous it is provided that in the presence of the emergency braking command, firstly the drive controller carries out the emergency-acting braking and converter control signals are transmitted to the converter via the not yet activated immobilizer, and the monitoring device monitors the converter operation and/or the converter control signals arriving at the converter and is configured in such a way that in the presence of the emergency braking command and a driving operation of the drive motor it activates the special braking mode by deactivating the drive controller or at least interrupting the signal flow of converter control signals of the drive controller to the immobilizer, activating the immobilizer and activating the alternate regulating device for generation of converter control signals, which produce a braking operation of the drive motor.

In the last-mentioned variant it is advantageous if the monitoring device ascertains on the basis of voltages and currents measured in the converter or motor or calculated for the converter or for the motor, or variables derived therefrom, the energy flow direction and on the basis of this infers the presence of a driving operation.

In a further variant that is regarded as being particularly advantageous it is provided that the monitoring device monitors the presence of the emergency braking command and in the presence of the emergency braking command immediately deactivates the drive controller or at least interrupts the signal flow of converter control signals of the drive controller to the immobilizer, activates the immobilizer and activates the alternate regulating device for generation of converter control signals, which produce a braking operation of the drive motor.

With a view to functional separation of the components, it is regarded as advantageous if the immobilizer has a hardware component or is formed by a hardware component, in particular a hardware component independent of the drive controller and the alternate regulating device.

The vehicle is preferably a rail vehicle.

The invention also relates, moreover, to a method for operating a vehicle in the presence of an emergency braking command, wherein the vehicle has: at least one drive motor with an electrically upstream electric converter, a drive controller for generating converter control signals for actuating the converter for a driving operation and a normal braking operation, and an immobilizer which is electrically connected between the converter and the drive controller and which is designed to prevent converter control signals, which would produce a driving operation of the drive motor, from being forwarded in the direction of the converter when the vehicle is stopped, in particular at a stop.

Inventively it is provided that in the presence of an emergency braking command a special braking mode is activated immediately or only when the drive controller malfunctions, wherein the drive controller is deactivated or at least the signal flow of converter control signals of the drive controller to the immobilizer is interrupted, the immobilizer is activated and with an alternate regulating device of the vehicle, converter control signals, which produce a braking operation of the drive motor, are transmitted to the converter via the immobilizer.

In respect of the advantages of the inventive method and in respect of advantageous embodiments of the inventive method, reference should be made to the above statements in conjunction with the inventive vehicle and the advantageous embodiments thereof.

The alternative regulating device and the drive controller are preferably functionally separate and are preferably operated independently of each other.

In a variant that is regarded as being particularly advantageous it is provided that in the case of the presence of the emergency braking command, firstly the drive controller carries out the emergency-acting braking and converter control signals are transmitted via the not yet activated immobilizer to the converter, and with a monitoring device the converter operation and/or the converter control signals arriving at the converter are monitored and in the presence of the emergency braking command and a driving operation of the drive motor a special operating mode is activated, wherein the drive controller is deactivated or at least the signal flow of converter control signals of the drive controller to the immobilizer is interrupted, the immobilizer is activated, and the alternate regulating device for generation of converter control signals, which produce a braking operation of the drive motor, is activated.

In a further variant that is regarded as being particularly advantageous it is provided that in the presence of the emergency braking command the drive controller is deactivated or at least the signal flow of converter control signals of the drive controller to the immobilizer is interrupted, the immobilizer is activated, and converter control signals, which produce a braking operation of the drive motor, are generated with an alternate regulating device.

The invention will be explained in more detail below with reference to exemplary embodiments.

DETAILED DESCRIPTION OF THE INVENTION

The same reference numerals are always used in the figures for identical or comparable components.

Figure 1:
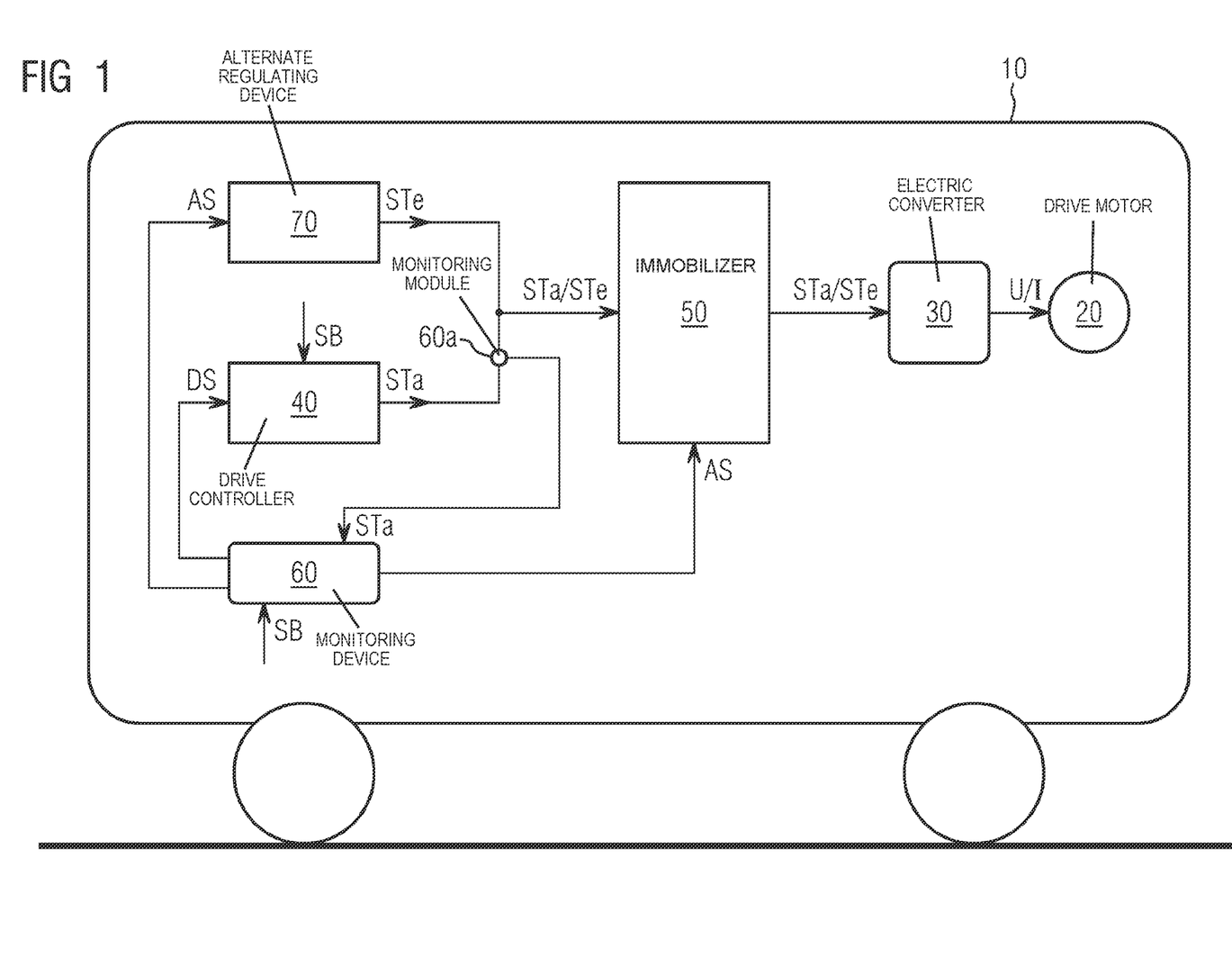
FIGS. 1-5 show exemplary embodiments for inventive vehicles, on the basis of which examples of exemplary embodiments of the inventive method will be explained, wherein in the exemplary embodiments in FIGS. 1 to 5, braking in the case of an emergency braking command firstly takes place with the drive controller.

FIG. 1 shows an exemplary embodiment for a vehicle 10, which is fitted with at least one drive motor 20 and an electric converter 30 electrically upstream of the drive motor 20.

A drive controller 40 of the vehicle can generate converter control signals STa, which for actuation of the converter 30 are optionally suitable for a driving operation or a braking operation of the drive motor 20. The drive controller 40 can thus—with correct mode of operation—serve to actuate the converter 30 also in the case of an emergency-acting braking operation in the presence of an emergency braking command SB.

In the exemplary embodiment in FIG. 1, the drive controller 40 is not directly connected to the converter 30 but separated therefrom by an immobilizer 50. The immobilizer 50 is electrically connected between the converter 30 and the drive controller 40 and serves to prevent converter control signals STa, which would produce a driving operation of the drive motor 20, from being forwarded in the direction of the converter 30 when the vehicle is stopped, in particular at a stop. The immobilizer 50 thus forms a safety device for the case where when the vehicle is stopped at a stop, a defective drive controller 40 can transmit converter control signals STa to the converter 30, which would lead to an undesirable and possibly dangerous driving operation. When the vehicle is stopped at a stop, for example at a station, the immobilizer 50 can be activated, for example by a vehicle driver.

The vehicle 10 is also fitted with a monitoring device 60, which monitors the converter control signals STa generated by the drive controller 40 and arriving at the converter 30. To make this possible the monitoring device 60 in the exemplary embodiment in FIG. 1 is connected to a monitoring module 60a, which is arranged in the signal path between the drive controller 40 and the immobilizer 50, and forwards the converter control signals STa to the monitoring device 60.

The vehicle 10 is also fitted with an alternate regulating device 70, which is designed to generate converter control signals STe, which produce or at least should be able to produce solely a braking operation of the drive motor 20, or with a high level of safety, solely a braking operation, in other words no driving operation. While the drive controller 40 can be used for both driving and braking operation, the alternate regulating device 70 is configured or suitable only for braking operation.

In the exemplary embodiment in FIG. 1, the drive controller 40, the monitoring device 60 and the alternate regulating device 70 enable a special braking mode, which can be activated in the presence of an emergency braking command SB; the drive controller 40, the monitoring device 60 and the alternate regulating device 70 are preferably operated as follows in the presence of an emergency braking command SB:

If the emergency braking command SB is present, the drive controller 40 will firstly carry out the emergency-acting braking and for this purpose transmit "braking" converter control signals STa to the converter 30 via the not yet activated immobilizer 50.

The monitoring device 60 monitors the converter control signals STa, generated by the drive controller 40 and arriving at the converter 30, by means of the monitoring module 60a. If during the course of this monitoring it establishes that, despite the presence of the emergency braking command SB, the drive controller 40 is generating "driving" converter control signals STa and therefore actuates a driving operation of the drive motor 20, it deactivates the drive controller 40 with a deactivation signal DS and activates the immobilizer 50 with an activation signal AS. In addition, with an activation signal AS it activates the alternate regulating device 70, which, instead of the deactivated drive controller 40, accordingly generates converter control signals STe, which should produce a braking operation of the drive motor 20.

Since the alternate regulating device 70 is technically configured only for the generation of converter control signals STe for a braking operation of the drive motor 20, it is ensured with great probability that a driving operation of the drive motor 20 is ruled out in the presence of the emergency braking command SB.

In summary therefore, in the exemplary embodiment in FIG. 1, the emergency-acting braking in the presence of an emergency braking command SB is firstly carried out by the drive controller 40, and there is a switchover to the alternate regulating device 70 only when or once the drive controller 40 generates incorrect, in other words non-braking, or even driving, converter control signals STa.

The alternate regulating device 70 is preferably functionally separate from and independent of the drive controller 40.

Figure 2:
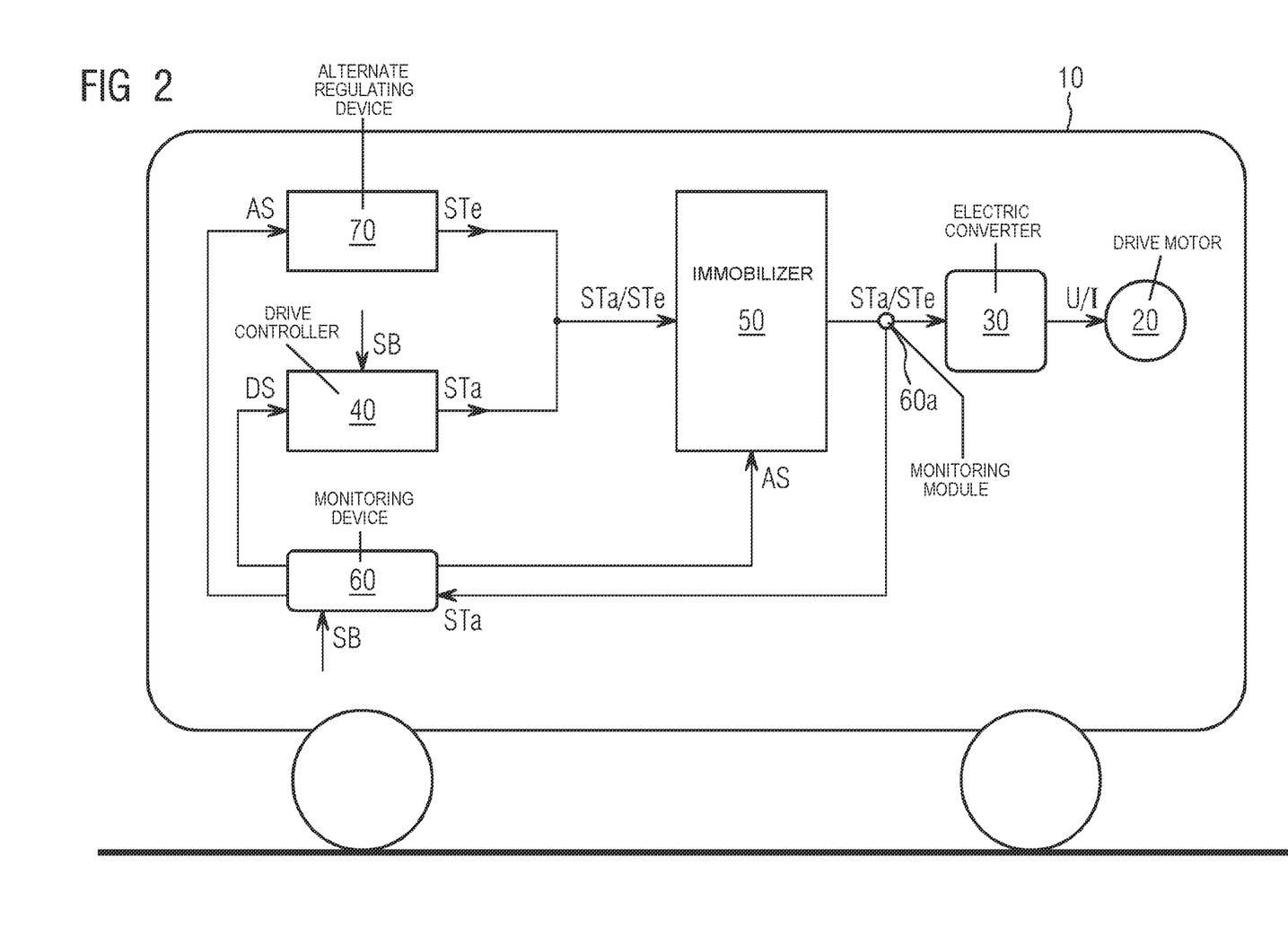

FIG. 2 shows a variant of the vehicle 10 in FIG. 1. In the exemplary embodiment in FIG. 2, the monitoring module 60a is arranged in the signal path between the immobilizer 50 and the converter 30 and forwards the converter control signals STa from there to the monitoring device 60. The above statements apply in conjunction with FIG. 1 accordingly, moreover.

Figure 3:
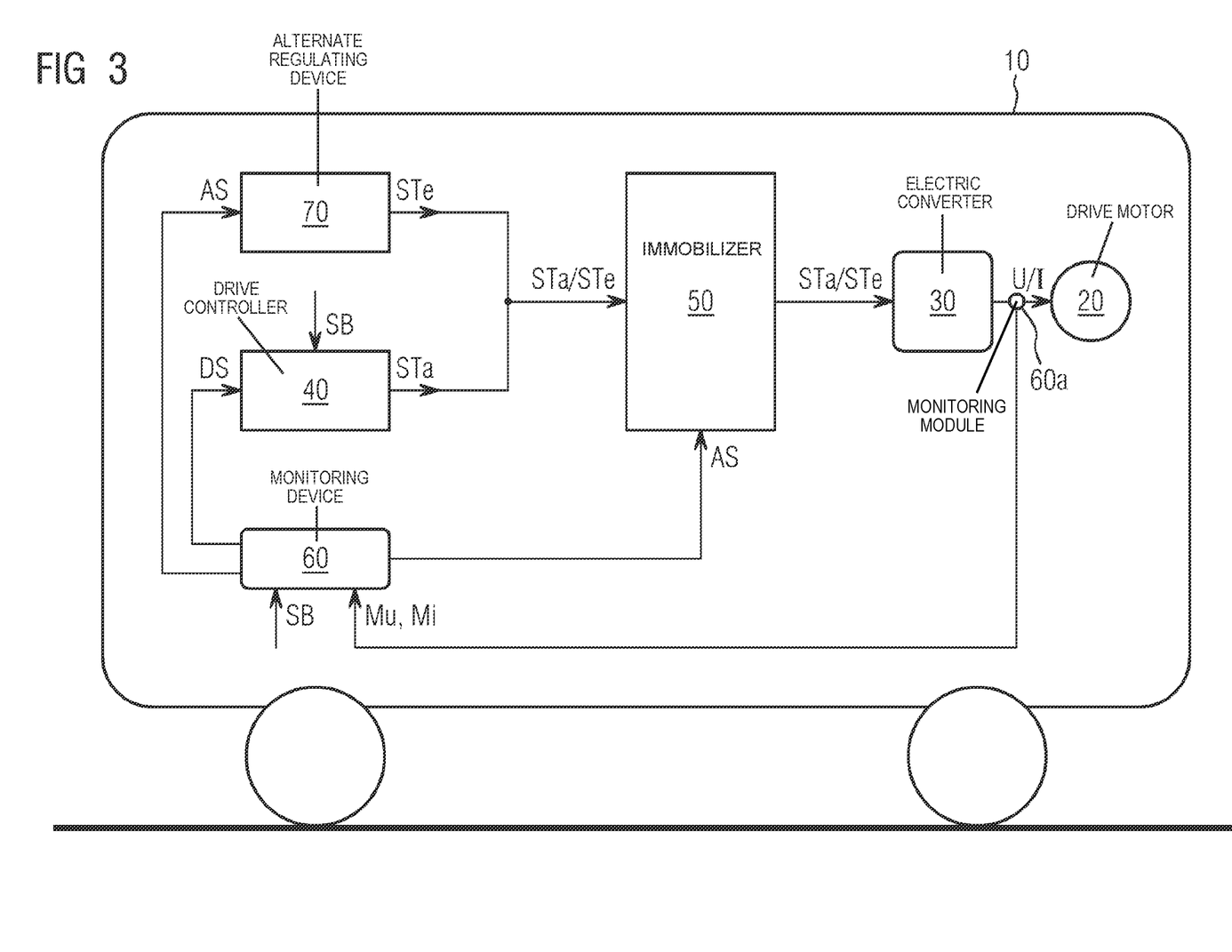

FIG. 3 shows a further variant of the vehicle 10 in FIG. 1. In the exemplary embodiment in FIG. 3, the monitoring module 60a does not monitor the converter control signals STa of the drive controller 40 but instead monitors the currents I flowing in the converter 30 and/or drive motor 20, forming current measured values Mi, and the voltages U present in the converter 30 and/or drive motor 20, forming voltage measured values Mu, and forwards the measured values Mu and Mi to the monitoring device 60.

The monitoring device 60 can therefore determine the energy flow direction on the basis of the measured values Mu and Mi or values derived therefrom, such as current indicators or voltage indicators, and deduce a driving operation or braking operation on the basis of the respective energy flow direction.

Alternatively or in addition, the monitoring device 60 can obtain the measured values Mu and Mi or values derived therefrom indirectly from other sources, which process or calculate these measured values. In this case, the monitoring module 60a can also be omitted.

Figure 4:
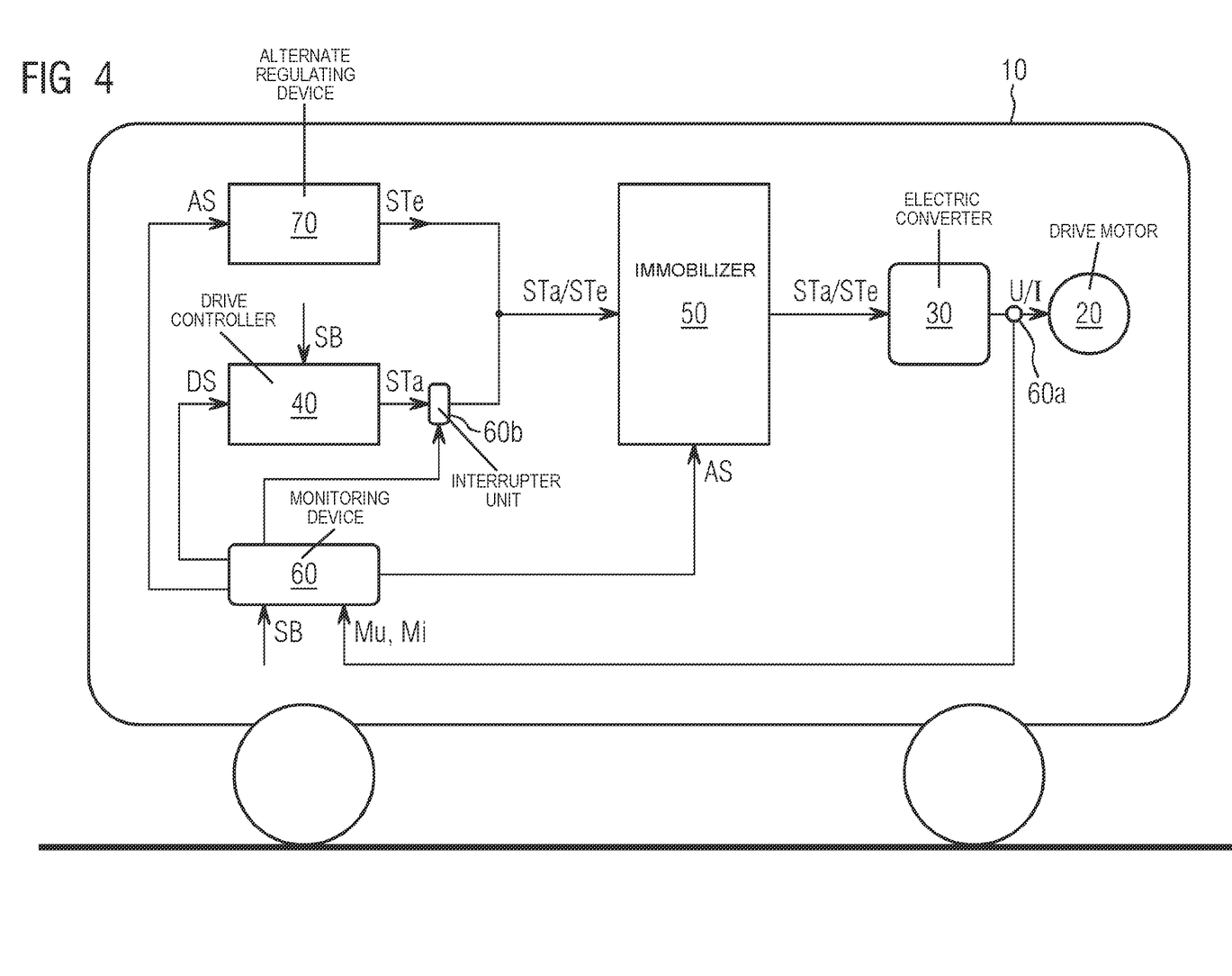

FIG. 4 shows a variant of the exemplary embodiment in FIG. 2. In the exemplary embodiment in FIG. 4, the monitoring device 60 is connected to an interrupter unit 60b, which is connected into the connecting line between the drive controller 40 and the immobilizer 50.

If the monitoring device 60 establishes a driving operation of the drive motor 20 despite the presence of the emergency braking command SB, for example on the basis of the ascertained energy flow direction, it thus activates the interrupter unit 60b and therefore interrupts forwarding of the converter control signals STa, which are output by the drive controller 40 on the output side in the direction of the immobilizer 50.

In the variant in FIG. 4, the interrupter unit 60b can alternatively or in addition be provided for a deactivation of the drive controller 40 by means of the deactivation signal DS.

The above statements in conjunction with FIGS. 1 to 3 apply, moreover.

Figure 5:
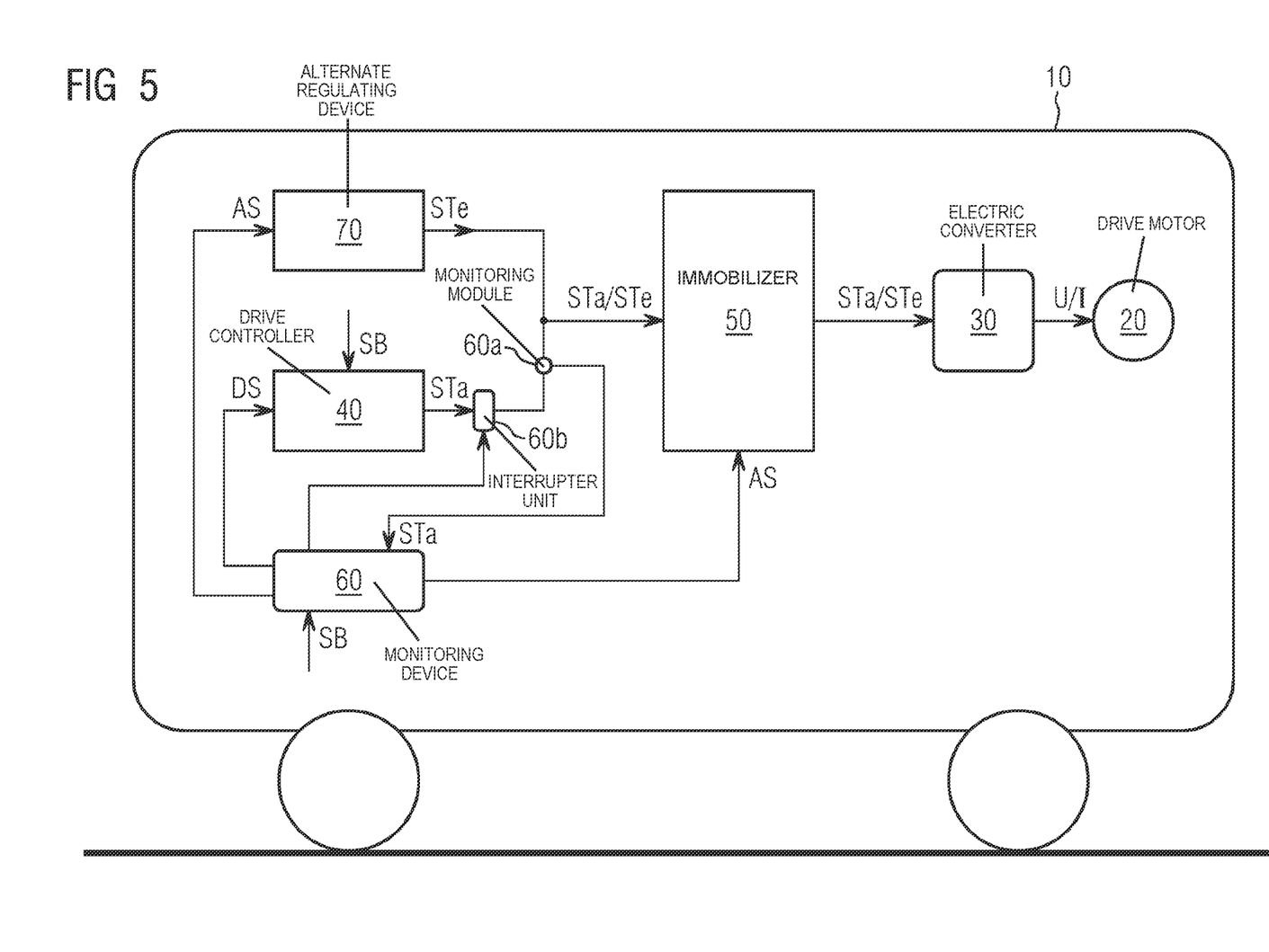

FIG. 5 shows a variant of the exemplary embodiment in FIG. 1. In the exemplary embodiment in FIG. 5 an interrupter unit 60b is connected in the signal flow direction upstream of the monitoring module 60a. This makes it possible for the monitoring device 60, after activation of the interrupter unit 60b, to check that no more converter control signals STa from the drive controller 40 are actually arriving at the immobilizer 50. Switching-off of the signal flow of the drive controller 40 in the direction of the immobilizer 50 by the interrupter unit 60b can therefore be monitored by the monitoring module 60a, so that this advantageously performs a dual function.

In the variant in FIG. 5, the interrupter unit 60b can alternatively or in addition be provided for deactivation of the drive controller 40 by means of the deactivation signal DS.

The above statements in conjunction with FIGS. 1 to 4 apply, moreover.

Figure 6:
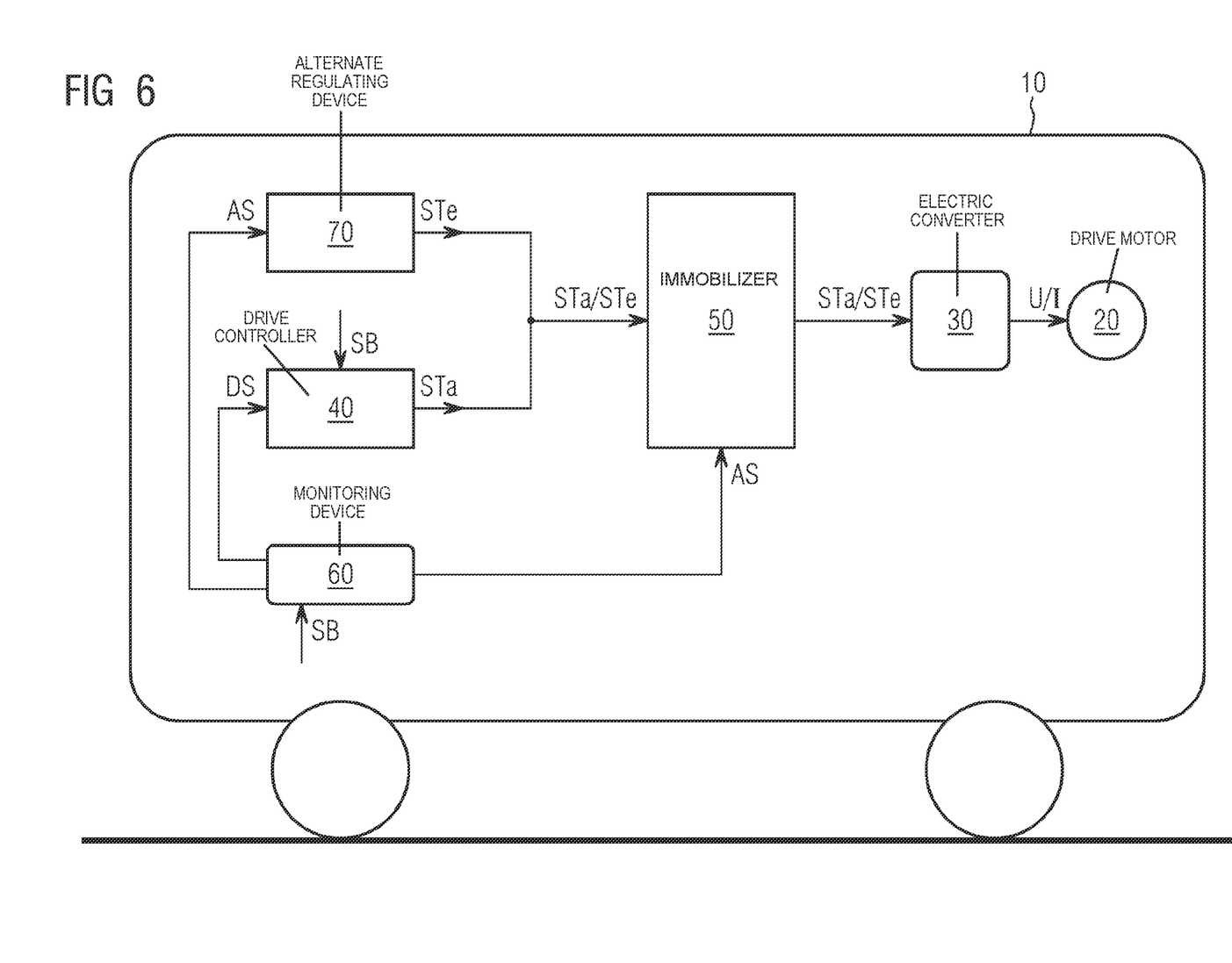
FIGS. 6-7 show further exemplary embodiments for inventive vehicles, on the basis of which examples of further exemplary embodiments of the inventive method will be explained, wherein in the exemplary embodiments in FIGS. 6 and 7, braking in the case of an emergency braking command begins immediately in the special braking mode.

FIG. 6 shows a further exemplary embodiment for a vehicle 10 in which a special braking mode is enabled in the presence of an emergency braking command SB. In contrast to the exemplary embodiments in FIGS. 1 to 5, the monitoring device 60 only monitors the presence of an emergency braking command SB and in the presence of the emergency braking command SB activates the special braking mode immediately.

The vehicle 10 in FIG. 6 is preferably operated as follows:

As soon as an emergency braking command SB is received by the monitoring device 60 it immediately deactivates the drive controller 40 by means of a deactivation signal DS and immediately activates the alternate regulating device 70 and the immobilizer 50 with activation signals AS.

In the exemplary embodiment in FIG. 6, the emergency-acting brake mode does not initially begin due to an actuation of the drive 20 by means of the drive controller 40 therefore, but directly due to generation of converter control signals STe by means of the alternate regulating device 70, which directly or immediately supersedes the drive controller 40 in the presence of the emergency-acting command SB.

Figure 7:
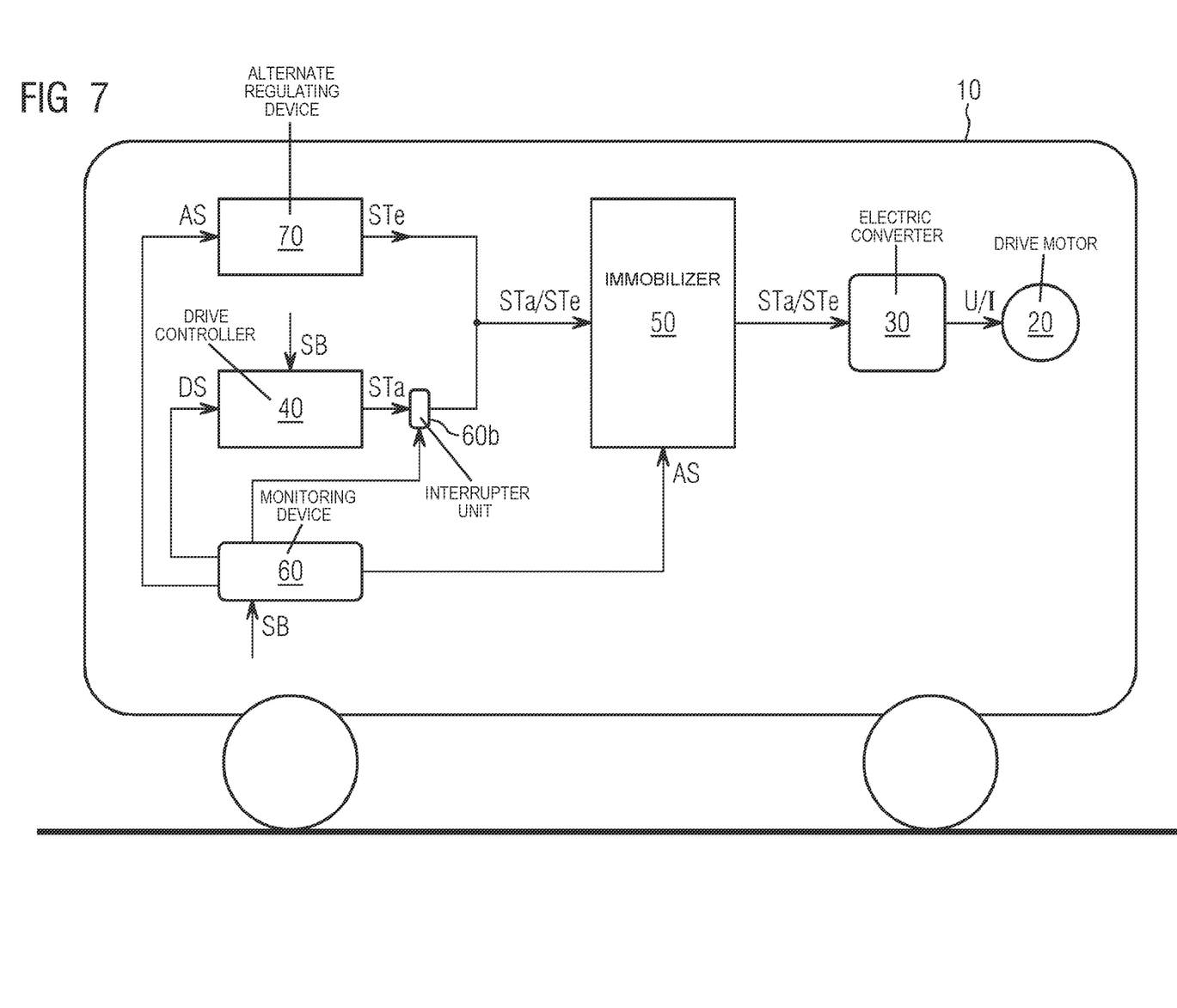

FIG. 7 shows a variant of the exemplary embodiment in FIG. 6. An additional interrupter unit 60b, which is arranged in the signal path between the drive controller 40 and the immobilizer 50, is provided in the variant in FIG. 7.

As soon as an emergency braking command SB is received by the monitoring device 60 the monitoring device 60 activates the interrupter unit 60b, so transmission of converter control signals STa by the drive controller 40 in the direction of the immobilizer 50 is reliably prevented irrespective of whether the immobilizer is still active or not.

The above statements in conjunction with FIGS. 1 to 6 apply accordingly, moreover.

Although the invention has been illustrated and described in detail by preferred exemplary embodiments, it is not limited by the disclosed examples and a person skilled in the art can derive other variations herefrom without departing from the scope of the invention.

LIST OF REFERENCE NUMERALS 10 vehicle
20 drive motor
30 converter
40 drive controller
50 immobilizer
60 monitoring device
60a monitoring module
60b interrupter unit
70 alternate regulating device
AS activation signal
DS deactivation signal
I currents
Mi current measured values
Mu voltage measured values
SB emergency braking command
STa converter control signal
STe converter control signal
U voltages

The invention claimed is:

1. A vehicle, comprising:
at least one drive motor;
an electric converter electrically connected upstream of said at least one drive motor;

a drive controller for generating converter control signals for actuating said converter for a driving operation and a normal braking operation;

an immobilizer electrically connected between said converter and said drive controller, said immobilizer configured to prevent converter control signals, which would produce a driving operation of said at least one drive motor, from being forwarded in a direction of said converter when the vehicle is stopped or at a stop;

an alternate regulating device and a monitoring device allowing a special braking mode to be activated in a presence of an emergency braking command and in an event of which:

said drive controller is deactivated or at least a signal flow of converter control signals of said drive controller to said immobilizer is interrupted, said immobilizer is activated, and converter control signals producing a braking operation of said at least one drive motor are transmitted to said converter through said immobilizer by said alternate regulating device.

2. The vehicle according to claim 1, wherein said alternate regulating device is functionally separate from and independent of said drive controller.

3. The vehicle according to claim 1, wherein said drive controller and said alternate regulating device are formed by functionally separate software modules being independent of each other and being executed by separate computing devices or by the same computing device.

4. The vehicle according to claim 1, wherein:

in the presence of the emergency braking command, firstly said drive controller carries out the emergency-acting braking and converter control signals are transmitted to said converter through said not yet activated immobilizer; and said monitoring device monitors at least one of converter operation or the converter control signals arriving at said converter and, in the presence of the emergency braking command and a driving operation of said at least one drive motor, said monitoring device is configured to activate the special braking mode by:

deactivating said drive controller or at least interrupting the signal flow of converter control signals of said drive controller to said immobilizer, activating said immobilizer, and activating said alternate regulating device for generation of converter control signals producing a braking operation of said at least one drive motor.

5. The vehicle according to claim 4, wherein said monitoring device ascertains an energy flow direction and therewith a driving operation based on voltages and currents measured in said converter or said at least one drive motor or calculated for said converter or for said at least one drive motor or variables derived therefrom.

6. The vehicle according to claim 1, wherein:

said monitoring device monitors the presence of the emergency braking command and, in the presence of the emergency braking command, immediately:

deactivates said drive controller or at least interrupts the signal flow of converter control signals of said drive controller to said immobilizer, activates said immobilizer, and activates said alternate regulating device for generation of converter control signals producing a braking operation of said at least one drive motor.

7. The vehicle according to claim 1, wherein said immobilizer has a hardware component or is formed by a hardware component or a hardware component independent of said drive controller and said alternate regulating device.

8. The vehicle according to claim 1, wherein the vehicle is a rail vehicle.

9. A method for operating a vehicle in a presence of an emergency braking command, the method comprising:

providing a vehicle including:

at least one drive motor, an electric converter electrically connected upstream of the at least one drive motor, a drive controller for generating converter control signals for actuating the converter for a driving operation and a normal braking operation, and an immobilizer electrically connected between the converter and the drive controller and configured to prevent converter control signals, which would produce a driving operation of the at least one drive motor, from being forwarded in a direction of the converter when the vehicle is stopped or at a stop;

in the presence of the emergency braking command, activating a special braking mode immediately or only when the drive controller malfunctions, by:

deactivating the drive controller or at least interrupting a signal flow of converter control signals of the drive controller to the immobilizer, activating the immobilizer, and using an alternate regulating device of the vehicle to transmit converter control signals, producing a braking operation of the drive motor, through the immobilizer to the converter.

10. The method according to claim 9, which further comprises functionally separating and independently operating the alternate regulating device and the drive controller.

11. The method according to claim 9, which further comprises:

upon the presence of the emergency braking command, firstly using the drive controller to carry out the emergency-acting braking and transmitting converter control signals to the converter through the not yet activated immobilizer; and using a monitoring device to monitor at least one of converter operation or the converter control signals arriving at the converter and, in the presence of the emergency braking command and a driving operation of the at least one drive motor, activating a special operating mode, by:

deactivating the drive controller or at least interrupting the signal flow of converter control signals of the drive controller to the immobilizer, activating the immobilizer, and activating the alternate regulating device for a generation of converter control signals producing a braking operation of the at least one drive motor.

12. The method according to claim 9, which further comprises immediately in the presence of the emergency braking command:

deactivating the drive controller or at least interrupting the signal flow of converter control signals of the drive controller to the immobilizer, activating the immobilizer, and using an alternate regulating device to generate converter control signals producing a braking operation of the at least one drive motor.

* * * * *